Figure 1:
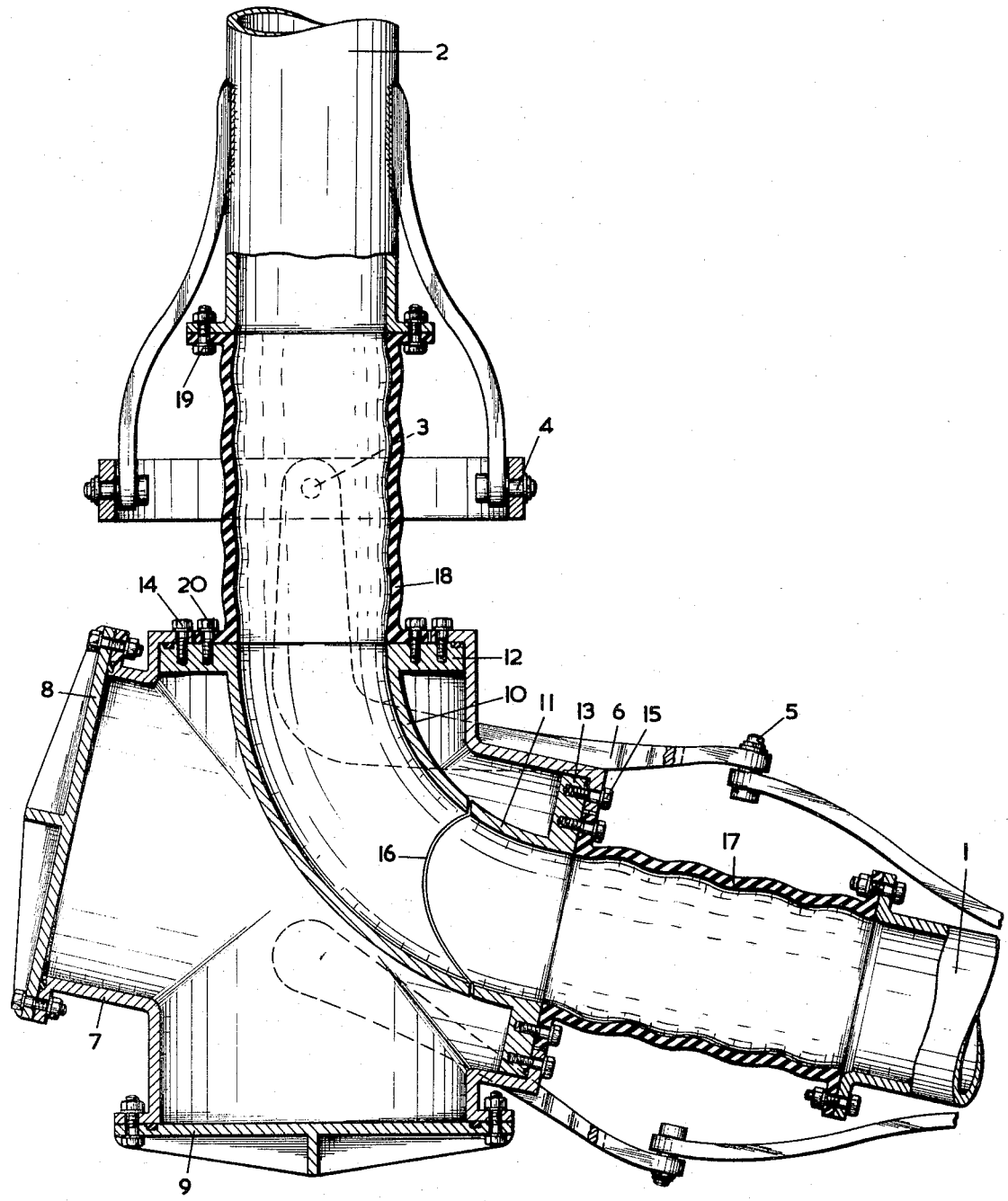

United States Patent [19]

Van Heijst

[11] 3,845,975
[45] Nov. 5, 1974

[54] HINGED PIPE JOINT

[75] Inventor: Willem Jan Van Heijst, Monte Carlo, Monaco

[73] Assignee: N.V. Industrieele Handelscombinatie Holland, Rotterdam, Netherlands

[22] Filed: Mar. 9, 1973

[21] Appl. No.: 339,555

[30] Foreign Application Priority Data
Mar. 10, 1972 Netherlands .................... 7203232

[52] U.S. Cl. .............................................. 285/283
[51] Int. Cl. ........................................... F16l 25/00
[58] Field of Search ....... 285/283, 15, 16, 127, 121, 285/163, 164, 235, 226

[56] References Cited
UNITED STATES PATENTS

| | | | |
|---|---|---|---|
| 399,747 | 3/1889 | Edwards | 285/121 X |
| 1,305,491 | 6/1919 | Poppenhusen | 285/121 X |
| 1,614,770 | 1/1927 | Ayling | 285/16 X |
| 1,626,490 | 4/1927 | Wotruba | 285/16 |
| 1,834,742 | 12/1931 | Roberts | 285/16 |
| 2,911,235 | 11/1959 | Stumbough | 285/127 X |

Primary Examiner—Alfred R. Guest
Attorney, Agent, or Firm—Young & Thompson

[57] ABSTRACT

A hinged pipe joint comprises at least one flexible sleeve surrounded by a cage-like cardan structure. The joint structure makes it difficult to remove and replace the flexible sleeve. The invention provides a housing to which the hinge structure is connected, with a flange secured therein to which a flange of the flexible sleeve is connected. The housing has a closable access door in alignment with the axis of the flange, so that when the cover of the door is open, the detached flexible sleeve and the flange may be removed and replaced through the door. If two flexible sleeves are connected to the housing at angles to each other, then two doors are provided. The flanges have curved portions secured thereto that serve as continuations of the pipeline within the housing.

5 Claims, 2 Drawing Figures

HINGED PIPE JOINT

The present invention relates to a hinged pipe joint, in which the ends hinged together of the rigid pipes are connected to each other by means of a hose for guiding the medium. Pipe joints of this kind are known. The hose is a simple means with which in a sealing manner a connection may be formed between the rigid pipes, which still permits the freedom of movement obtained by the hinge. A hose of this kind, however, will have to be replaced now and then, which requires disassembling of the hinge joint. This is very difficult with transmission lines with a large diameter, certainly when the joint to be disconnected lies under water.

It is an object of this invention to provide a joint for pipelines with large dimensions, whereby the hose can be replaced easily without the necessity of disassembling the hinge joint.

In accordance with the invention, said object is achieved in that at one end the hose is secured to a mounting flange, said flange being secured again in a housing, said housing being secured to the hinge structure and being provided with one or more openings closed by covers, said mounting flange being secured on the inside of the housing and being able to pass through said opening or openings. In this manner it is achieved that after opening one or more covers of the housing secured to the hinge structure and after disconnecting the mounting elements of the hose and of the mounting flange said mounting elements and the hose may be taken out of the housing and, thus, can be removed and replaced by new parts.

In the most simple embodiment, the joint comprises a housing wherein the disconnected hose with the flange may be pushed back in axial direction and subsequently may be lifted transversely out of said housing through an opening situated in the longitudinal direction of the pipe, after the cover of said opening has been opened.

In all embodiments, the housing itself may serve as part of the pipeline. According to the invention it is preferable when a pipe section connects to the mounting flange, the other end of said pipe section inside the housing being butt-jointed to the continuation of the pipeline. The butt-joint needs not be tight because said joint lies inside the housing; however, the flow is guided in a better manner.

The pipe section may be straight but it may also be a curved section, which is divided, whereby, if necessary, both sections with mounting flanges are secured in the housing and said housing will have openings provided with covers, said openings being in line with both centre lines of the mounting flanges. This embodiment is particularly suitable at the region where the pipeline makes a sharp bend, such as e.g. at the middle cardan joint of the pipeline according to copending U.S. application Ser. No. 334,214 filed Feb. 21, 1973 filed at the same time. The joint between the two portions of the curved section needs not be tight either. The hoses may be secured in any suitable manner, however, they are preferably secured to the pipe ends and to the portions of the curved section respectively by means of flanges in a manner known as such.

Figure 2:
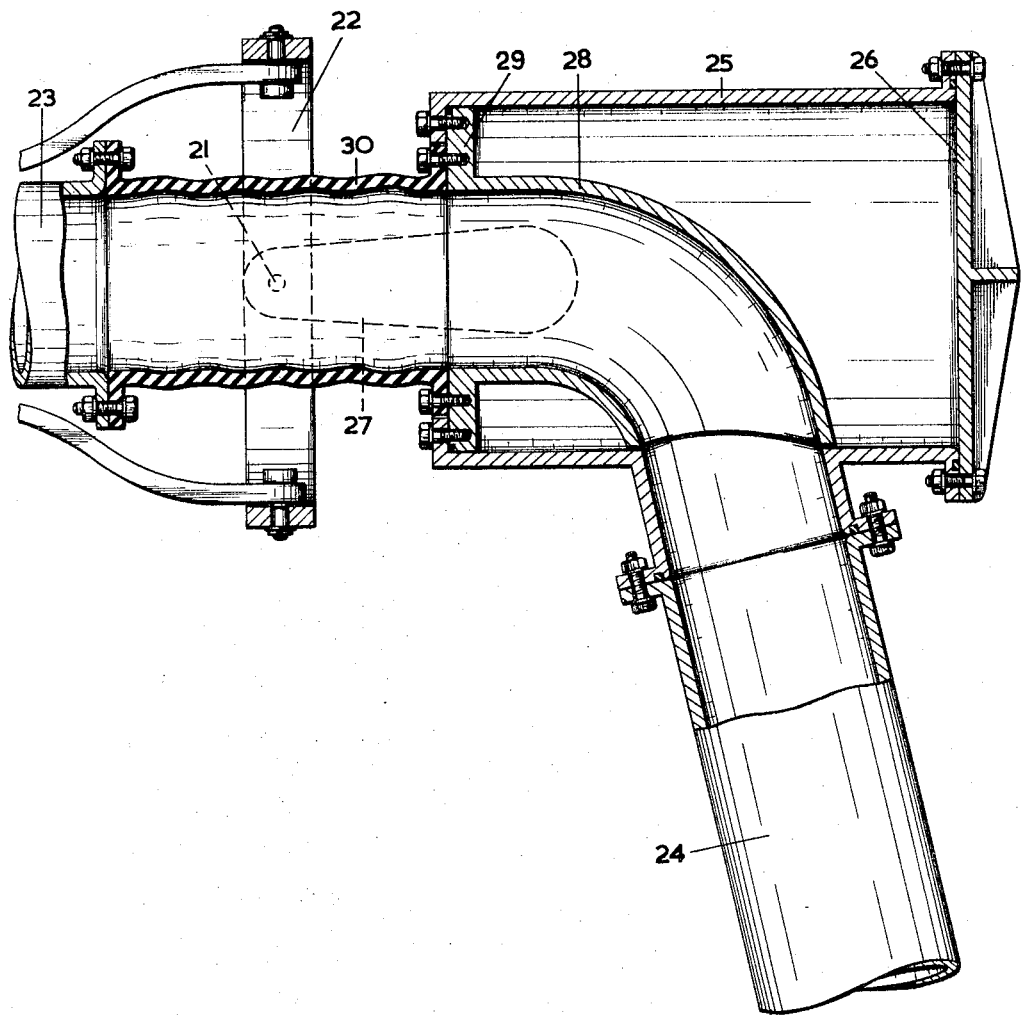

The invention will now be described more in detail with reference to the accompanying drawings, wherein:

FIG. 1 is a section of an embodiment; and
FIG. 2 shows a more simple mode of embodiment In the embodiment as illustrated in FIG. 1 the pipes 1 and 2 are connected to each other by means of a cardan joint, the two pivot pins of said joint being indicated by reference numerals 3 and 4, and a third pivot pin being illustrated at reference numeral 5.

Arms 6 are present between pivot pins 3 and 5 and a housing 7 is secured to said arms. This housing is provided with openings closed by covers 8 and 9 and a curved section is present inside this housing, said section consisting of parts 10 and 11 which are secured with flanges 12 and 13 respectively on the inside of the housing 7 with aid of bolts 14 and 15 respectively, said curved section being divided at reference numeral 16. Between the outer end of pipe 1 and part 11 of the curved section a hose 17 is present which is also secured with flanges.

Another hose 18 is present between pipe end 2 and part 10 of the curved section, said hose being provided with flanges and being secured with bolts 19 and 20 respectively.

If one wants to replace the hoses, first of all the covers 9 and 8 are removed and then the bolts 14 and 19 are unscrewed, whereupon the curved section part 10 with hose 18 may be removed through the opening opened by the cover 9 and the hose may be removed by unscrewing the bolts 20. Thereupon the hose 17 with curved section 11 may be removed through the opening near the cover 8 in a similar manner. Naturally, assembling takes place in reverse order.

It will be apparent that the connections of hoses 17 and 18 need not be made by means of flanges. Any other type of coupling can be used here.

FIG. 2 shows an embodiment with a single cardan joint 21, 22 between the pipes 23, 24. Pipe 24 is connected to the housing 25 provided with cover 26 and arms 27. In the housing a curved section 28 with flange 29 is present, to which flange the hose 30 is secured.

Moreover, when studying the drawing it will be obvious that the principle does not change when instead of two or three pivot pins there would be only one.

Furthermore, the covers may be located also at other places than those shown in the drawings.

What is claimed is:

1. In a hinged pipe joint comprising a pair of rigid pipes, at least one flexible sleeve between the rigid pipes, and hinge structure interconnecting the rigid pipes and surrounding the flexible sleeve; the improvement comprising a housing, a flange secured in said housing, one end of said flexible sleeve being secured to said flange, said hinge structure being secured to said housing, at least one door through said housing in line with the axis of said flange, and a removable cover closing said opening.

2. A pipe joint as claimed in claim 1, said flange having a rigid pipe section secured thereto in a continuation of said flexible sleeve within said housing.

3. A pipe joint as claimed in claim 2, said pipe section being curved.

4. A pipe joint as claimed in claim 1, there being a pair of said flexible sleeves one secured to each said rigid pipe and both secured to different sides of said housing by two said flanges, the axes of said flanges being disposed at an angle to each other, there being a said door and cover in said housing in line with the axis of each said flange.

5. A pipe joint as claimed in claim 4, said flanges having curved pipe sections secured thereto within said housing, said pipe sections meeting each other in endwise abutment.

* * * * *